Patented Aug. 7, 1934

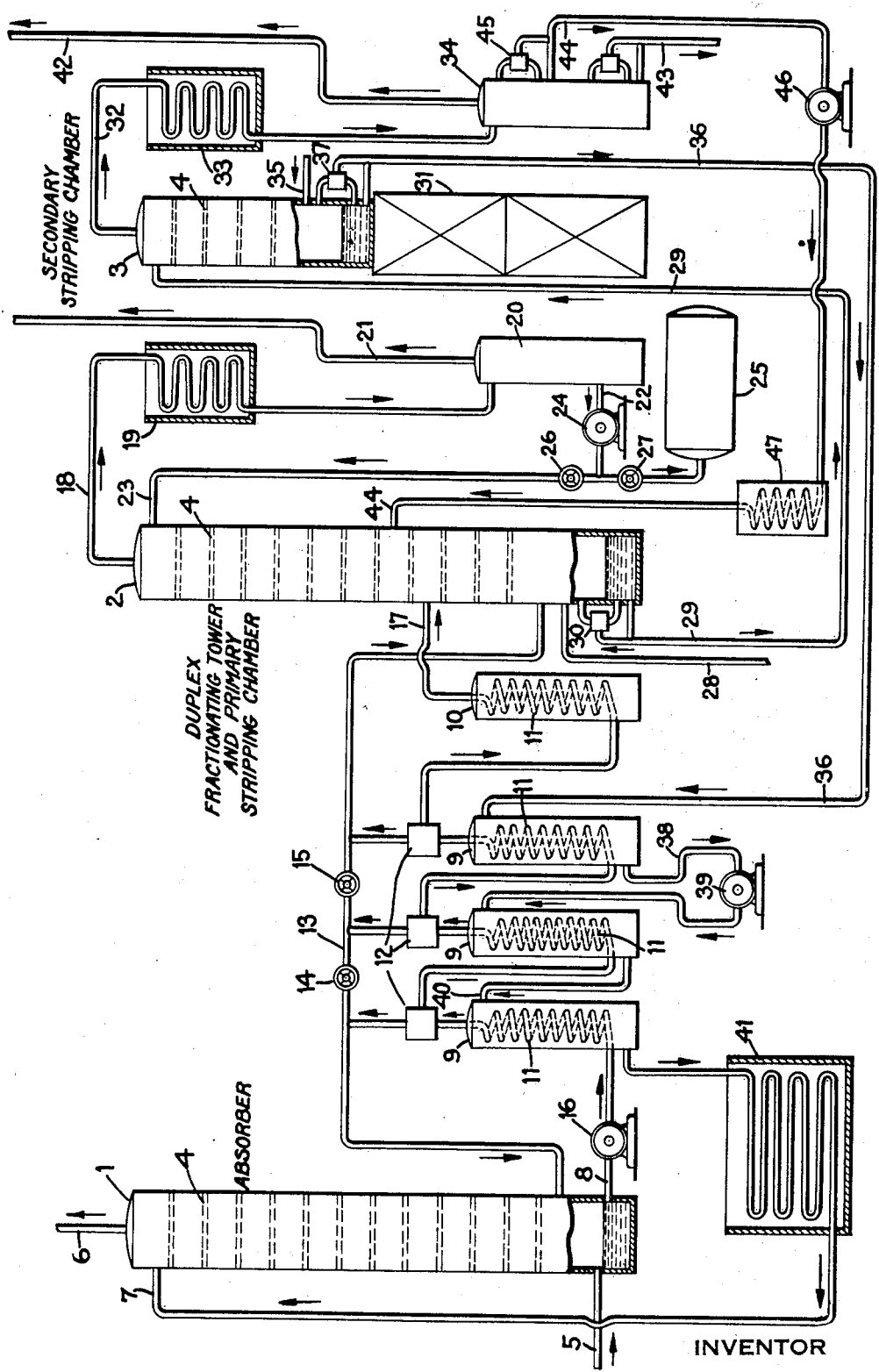

1,969,207

UNITED STATES PATENT OFFICE 1,969,207

NATURAL GASOLINE RECOVERY

Howard S. Cole, Jr., Pasadena, and Edwin R. Cox, Los Angeles, Calif., assignors to The Texas Company, New York, N. Y., a corporation of Delaware Application September 30, 1930, Serial No. 485,396

13 Claims. (Cl. 196—8)

Our invention relates to the recovery of gasoline from natural gas by absorption of the gasoline in a liquid absorption medium, and has to do particularly with certain improvements in the distillation and fractionation of absorbed gasoline.

In accordance with our invention, the natural gasoline is absorbed from natural gas and a rich absorbent oil laden with natural gasoline-like constitutents is subjected to successive distillation or stripping operations. In the first operation, the light fractions of the gasoline are removed from the absorbent oil under substantial pressure and with little or no steam. In the second operation the heavy gasoline fractions are stripped from the partially denuded oil under a relatively low pressure and with the aid of steam. The invention also involves a duplex or combined distillation and fractionation apparatus, wherein natural gasoline may be distilled and fractionated in a single zone. Various other modifications in process and apparatus also come within the scope of the invention, which will hereinafter be more fully described.

The customary method of separating absorbed gasoline from absorbent oil is to remove all the gasoline constituents from the absorbent oil in a single stripping chamber. This chamber is kept under considerable pressure in order that the incondensible vapors may be forced back through the absorber or, if they are to be recompressed, that the volume of vapors handled may be kept as small as possible. Consequently, in order to vaporize the absorbed gasoline fractions under this pressure, excessive amounts of steam are usually necessary and even after they are vaporized, large volumes of cooling water are required to condense the gasoline constituents therefrom. Furthermore, these vapors, which contain excess steam are difficultly fractionated and the end point of the distillate can be controlled only by the use of a large quantity of reflux medium. The advantages of our invention over the prior methods will appear as the process and aparatus are described.

Referring to the accompanying drawing, which is an elevation partly in section of an apparatus suitable for carrying out the process, the apparatus comprises, essentially, an absorber 1, a duplex or combined fractionating tower and stripping chamber 2, and a secondary stripping chamber 3; each provided with suitable trays 4. The absorber is provided with an inlet 5 for wet gas, an outlet 6 for dry gas, an inlet 7 for lean absorbent oil and an outlet 8 for rich absorbent oil.

Between the absorber and the duplex fractionating tower and stripping chamber 2 are located a series of heat exchangers 9 and a preheater 10; all contain separate internal coils 11. Vapor vents 12 are positioned between each of the coils 11. These vents are connected to a vapor line 13, controlled by valves 14 and 15. The vapor line 13, in turn, is attached, at its opposite ends, to the absorber 1 and the duplex chamber 2. The pump 16, interposed in line 8, forces liquid from the bottom of absorber 1 through the coils 11 in the heat exchangers, the vents 12, preheater 10 and finally through line 17 into the chamber 2.

The duplex chamber 2 comprises a primary stripping chamber and a fractionating tower; the part below the rich oil inlet 17 serves as stripping chamber, while that above and superimposed on the stripping chamber operates as a fractionating tower. At the top of the fractionating tower is located a vapor line 18, which connects the tower to a condenser 19 and receiver 20, the latter having gas release pipe 21 and liquid draw-off pipe 22. Near the top of the fractionating tower is also located a liquid line 23 through which a portion of the condensate from the receiver 20 may be forced by pump 24 to the top of the tower while the other portion may be passed to run-down tank 25; the relative amounts of each portion of the condensate which passes to the fractionating tower and the tank 25 is regulated by valves 26 and 27 respectively. At the bottom of chamber 2 are installed a steam line 28 and a liquid line 29. The latter is connected to the secondary stripping chamber 3 and is controlled by float valve 30.

The secondary stripping chamber 3 is situated in an elevated position on stand 31. A vapor line 32 located at the top of this chamber extends through condenser 33 to receiver 34. At the bottom of chamber 3 is attached a pipe 35 for introducing steam. The chamber 3 is indirectly joined, by a number of connections and elements, to the absorber 1 for returning lean absorbent oil to the absorber. Thus the bottom of the chamber is connected to the last of the heat exchangers by line 36. The heat exchangers are next joined by lines 38 and 40; the former having a pump 39 interposed thereon. The first heat exchanger is then connected to the absorber by pipe 7, in which is located a cooler 41.

The receiver 34 previously mentioned is provided at the top with gas release pipe 42, and at the bottom with water drain 43. At the side is located a condensate draw-off pipe 44, controlled by float valve 45. This pipe conducts the condensate to the fractionating tower 2, via pump 46 and temperature regulator 47.

The operation of the apparatus is as follows: A wet gas containing a substantial amount of gasoline vapors is passed into the bottom of the absorber through pipe 5, and bubbles up through the trays 4, thereby coming into intimate contact with the absorbent oil introduced at the top of the tower through pipe 7. The rich absorbent oil is forced by pump 16 from the bottom of the absorber through pipe 8 to the heat exchangers 9. In the heat exchangers the rich oil absorbs heat and at the same time cools the hot lean oil from the secondary stripping chamber 3. After leaving the exchangers, the rich oil is further heated, preferably by steam in preheater 10, before it is introduced into the chamber 2.

As the rich oil is gradually heated in the exchangers, gases are evolved and lighter hydrocarbons are vaporized. The gaseous products evolved in the first exchanger are preferably released in the first of the vents 12 and returned to the absorber, where they find their way out of the system with the dry gases. The extremely light products from the intermediate exchanger may be returned either to the absorber or to the fractionating chamber 2 by proper regulation of valves 14 and 15. The light vapors from the last heat exchanger are preferably conducted to the primary stripping chamber 2. It will therefore be apparent that by proper venting of the heat exchangers and regulating the valves 14 and 15, absorbent oil containing substantially no products lighter than gasoline pass to the stripping chambers.

While each heat exchanger 9 is shown in the drawing as provided with a vent 12, this is not absolutely necessary to our process. The evolved gases and vapors may be conducted along with the rich absorbent oil to the primary stripping chamber; however, to facilitate fractionation and regulation of the pressure, we prefer that the products lighter than gasoline be vented off as indicated and that the rich absorbent oil delivered to the primary stripping chamber be substantially free from constituents more volatile than gasoline.

The chamber 2, comprising the primary stripper and the fractionating tower, is preferably maintained under a pressure of 15 to 30 pounds per square inch. Instead of the customary practice, however, of distilling all the gasoline content from the absorbent in this striper, only the more volatile fractions which readily vaporize with little or no steam are distilled. These volatile fractions then pass to the superimposed fractionating tower to be fractionated with the heavier fractions from the secondary stripper.

The fractionating tower is shown superimposed on the primary stripping chamber and the two comprise a duplex or combined fractionating tower and primary stripping chamber. This arrangement is, also, not strictly essential, and our invention contemplates an arrangement whereby the fractionating tower and stripper may constitute single elements. We prefer, however, the duplex character of the elements since it is more compact and, also, the reflux from the fractionating tower is mixed in a simple manner with the partially denuded absorbent oil and passed to the secondary stripper.

The partially denuded absorbent oil is released from the bottom of the primary stripping chamber through the pipe 29. This oil is under sufficient pressure to force it to the elevated chamber 3. In the secondary stripper 3, the remaining gasoline content of the absorbent oil is vaporized with the aid of steam. The amount of steam required, however, is not large because there is substantially no pressure to overcome during the vaporization. The vapors, consisting of the heavier gasoline fractions, are, also, at a relatively low temperature, and therefor can be condensed with a moderate supply of cooling water. Substantially no light constituents are present to be released through pipe 42.

The condensate of oil in receiver 34 is separated from condensed water and the oil distillate pumped to chamber 2 where it enters about midway thereof. It is vaporized on entering the chamber and the vapors pass up through the superimposed fractionating tower to be fractionated with the vapors from the primary stripper. The temperature of the oil passing into the chamber 2 from the line 44 may be regulated by the temperature regulator 47; preferably, it is heated by steam or other means, so that the product as it enters the chamber is in the form of vapor or else it immediately vaporizes on entering thereto.

End point gasoline vapors are taken from the top of the fractionating tower through pipe 18. The vapors are condensed and collected in a receiver 20. Uncondensed gases or vapors may be released through pipe 21 to control the pressure, and the released products are usually recompressed from 150 to 200 pounds per square inch to recover the gasoline content. The condensate in receiver 20 may all be delivered to run-down tank 25, but it is preferable to pump a portion to the top of the fractionating tower to act as a reflux for controlling the end point of the vapors passing therefrom. It will be observed that by having little or no steam and vapors of substantially gasoline character only in the fractionating tower, the end point of the distillate is easily controlled.

Attention is called to the elevated position of the secondary stripping chamber 3. The chief function of this arrangement is to overcome the pressure on the absorbent oil delivered thereto from the primary stripping chamber and to produce a pressure differential between the two stripping chambers. The difference in pressure is preferably just sufficient to force the partially stripped oil through line 29 from the primary stripper to the top of the secondary stripper. In practice, 15 to 30 pounds per square inch is usually maintained on the primary stripper, but a much lower pressure, preferably 0 to 10 pounds per square inch may be maintained on the secondary stripper if the elevation is properly regulated. This low pressure as pointed out heretofore, requires little agitation steam to remove the gasoline fractions, and as a consequence the vapors can be readily condensed without large quantities of cooling water. The elevated position of the secondary stripper 3 also enables a head of oil to collect therein. The denuded oil collecting in this way, at the bottom of the stripper, flows by gravity through a part of the exchangers 9, thereby reducing the pump energy ordinarily required.

The lean absorbent oil, collecting in the bottom of chamber 3 is at a relatively high temperature, usually 200 to 300° F. It gravitates through the first part of the heat exchangers 9 and then it is forced by pump 39 through the remaining part of the exchangers. In the exchangers, it gives up its heat to the rich absorbent oil flowing through coils 11. The lean oil issuing from the exchangers usually has been reduced in temperature to about 100 to 150° F. In the cooler 41, the temperature is further reduced to about 25 to 75° F. before the oil is introduced into the absorber.

By carrying out our process, substantially as described, with a wet gas containing 0.5 to 5 gallons of gasoline per 1000 cubic feet, a relatively stable gasoline is recovered. The quantity of reflux medium is greatly reduced and yet the end point controlled in an efficient manner. The temperature of the oil in the stripping zone may be reduced 25 to 100° F. below that which was customary heretofore and a saving of 5 to 25 percent in steam consumption may be realized.

It is to be understood that a working system for carrying out the invention has been given merely for purposes of illustration and that we do not wish to be limited by the form and use of the specific parts described. Use of certain parts separately and modifications in arrangement and form of the elements may be made without departing from the spirit of the invention. We therefore wish to be limited only by the appended claims, in which we intend to claim everything inherently novel.

We claim:

1. A method of recovering gasoline from natural gas which comprises absorbing the gasoline and lighter hydrocarbons by an absorbent oil in an absorption zone, passing rich absorbent oil containing a substantial amount of absorbed gasoline and lighter hydrocarbons through a heat exchange zone, venting from said heat exchange zone hydrocarbons lighter than gasoline and returning the same to said absorption zone, passing the rich absorbent oil containing the gasoline constituents successively to primary and secondary stripping zones, removing the light fraction of the gasoline in the primary stripping zone and the heavy fraction in the secondary stripping zone, fractionating both fractions of gasoline in a single fractionating zone, conducting hot absorbent oil substantially free from gasoline from the secondary stripping zone through said heat exchange zone in heat exchange relation with the rich absorbent oil, and recovering a gasoline distillate from said fractionating zone.

2. A method of natural gasoline recovery which comprises absorbing the gasoline from natural gas in an absorbent oil, removing the gasoline from the absorbent oil in successive stages of stripping, vaporizing the light fraction of the gasoline in the first stage and passing the vapors to a fractionating zone, vaporizing the heavy fraction of the gasoline in the second stage, separately condensing the vapors from said second stage, fractionating the resulting condensate of heavy gasoline hydrocarbons in said fractionating zone after revaporization thereof, and recovering a gasoline distillate from the fractionating zone.

3. A method of natural gasoline recovery which comprises absorbing the gasoline from natural gas in an absorbent oil, passing rich absorbent oil containing a substantial amount of absorbed gasoline through a heat exchange zone to preheat the rich absorbent oil by heat exchange with hot lean oil, stripping said preheated oil in successive stages of evaporation to remove the light fraction of gasoline in the first stage under pressure then elevating the partially stripped oil under its own pressure to substantially reduce the pressure thereon and removing the heavy fraction in the second stage, flowing the lean absorbent oil from said second stage of evaporation by gravity through said heat exchange zone, fractionating the gasoline fractions from both evaporation stages in a common fractionating zone, and recovering a gasoline distillate therefrom.

4. A method of natural gasoline recovery which comprises absorbing the gasoline from natural gas in an absorbent oil, passing rich absorbent oil containing a substantial amount of absorbed gasoline through a heat exchange zone to preheat the absorbent oil by heat exchange with hot lean oil, stripping said preheated oil in successive stages of evaporation to remove the light fraction of gasoline in the first stage under pressure then elevating the partially stripped oil under its own pressure to substantially reduce the pressure thereon and removing the heavy fraction in the second stage, fractionating both fractions in a single fractionating zone and recovering a gasoline distillate therefrom, flowing the lean absorbent from said second stage of evaporation by gravity through a portion of said heat exchange zone, then forcing by mechanical means said lean oil through the remainder of said heat exchange zone.

5. A method of recovering absorbed gasoline from an absorbent oil which comprises subjecting the absorbent oil containing absorbed gasoline to successive stripping operations, stripping the more volatile fractions of the absorbed gasoline from the absorbent oil in the first stripping operation under substantial superatmospheric pressure, subjecting the partially stripped oil to a distillation operation under a pressure substantially lower than said first stripping operation to vaporize the less volatile fractions of the gasoline, and combining and fractionating the fractions of gasoline separated in both stripping operations under substantially higher pressure than that maintained in the second stripping operation.

6. A method of recovering absorbed gasoline from an absorbent oil which comprises subjecting the absorbent oil containing absorbed gasoline to successive stripping operations, separating the more volatile fractions of the gasoline from the absorbent oil in a primary stripping operation by vaporization under superatmospheric pressure and in the presence of substantially no steam, subjecting the partially stripped absorbent oil to a secondary stripping operation and distilling the less volatile fractions of the gasoline therefrom with the aid of steam and under a substantially lower pressure than that maintained during said primary stripping operation, condensing the steam and separating the water from the less volatile constituents of gasoline distilled in said secondary stripping operation, combining the fractions of gasoline separated in both stripping operations and fractionating the mixture under a pressure substantially the same as that maintained in the primary stripping operation.

7. A method of recovering absorbed gasoline from an absorbent oil which comprises passing the absorbent oil containing absorbed gasoline to a combined stripping and fractionating tower, vaporizing the light gasoline fractions of the gasoline in the stripping and fractionating tower under a higher pressure, passing the partially stripped absorbent oil from said tower to an evaporator wherein the heavy fractions of the gasoline are vaporized under a lower pressure, combining said heavy fractions with the light fractions in said stripping and fractionating tower to cause fractionation thereof under said higher pressure, and recovering a gasoline distillate from the stripping and fractionating tower.

8. A method of recovering absorbed gasoline from an absorbent oil which comprises passing the absorbent oil containing absorbed gasoline to a combined stripping and fractionating tower, stripping and fractionating the lighter constituents of the absorbed gasoline from the absorbent oil in said tower under a higher pressure with substantially no steam, passing the partially stripped absorbent oil to an evaporator, distilling the heavier fraction of the gasoline from the absorbent oil in said evaporator with the aid of steam and under a substantially lower pressure, condensing the vapors from the evaporator and separating the water from the condensate, returning the resultant water free condensate to the combined stripping and fractionating tower and fractionating both the lighter and heavier fractions of the gasoline under the higher pressure in said combined tower and in the absence of substantial amounts of steam.

9. An apparatus for recovering gasoline from natural gas comprising an absorber, a primary stripping chamber, and a secondary stripping chamber serially connected, a fractionating tower, means for passing vapors from the primary stripping chamber to the fractionating tower, means for separately condensing and recovering the distillate vaporized in the secondary stripping chamber, means for revaporizing and for passing the revaporized distillate to said fractionating tower and means for recovering a gasoline distillate from the fractionating tower.

10. An apparatus for recovering gasoline from natural gas, comprising an absorber, a heat exchanger, a primary stripping chamber, means for passing rich oil from the absorber through the heat exchanger to said primary stripping chamber, a secondary stripping chamber located in an elevated position with respect to the primary stripping chamber to create a hydrostatic head of oil and to reduce the pressure therein, means for passing partially stripped absorbent oil from the primary to the secondary stripping chamber by the pressure on the oil in the primary stripping chamber means for passing a lean oil substantially free from gasoline by gravity through said heat exchanger, a fractionating tower, means for conducting distilled products from the primary and secondary stripping chambers to said fractionating tower, and means for recovering a gasoline distillate from said fractionating tower.

11. In an apparatus for recovering gasoline from natural gas the combination of an absorber, primary and secondary stripping chambers serially connected, a fractionating tower superimposed on and integral with said primary stripping chamber, and adapted to receive vapors therefrom, means for recovering an oil distillate from said secondary stripping chamber, means for revaporizing and passing said distillate to the fractionating tower and means for recovering a gasoline distillate from said fractionating tower.

12. In an apparatus for recovering gasoline from natural gas the combination of an absorber, primary and secondary stripping chambers serially connected, a fractionating tower superimposed on said primary stripping chamber and adapted to receive vapors therefrom, means including a stand whereon the secondary stripping chamber is located in an elevated position relative to the primary stripping chamber for maintaining a differential pressure between the primary and secondary stripping chambers, means for revaporizing and passing distillate fractions from said secondary stripper to the fractionating tower, and means for recovering a gasoline distillate from the fractionating tower.

13. An apparatus for recovering gasoline from natural gas comprising an absorber, a preheater and a fractionating tower superimposed on and adapted to receive vapors from the primary stripping chamber, means for passing rich absorbent oil from the absorber through the preheater and then into the primary stripping chamber, a secondary stripping chamber, means for passing oil from the primary to the secondary stripping chamber, means for condensing and conducting the distillate from the secondary stripping chamber to said fractionating tower, means for passing lean oil from the secondary stripping chamber to the absorber, means for recovering a distillate from the fractionating tower, and means for passing a portion of said distillate back to said fractionating tower as a reflux medium.

HOWARD S. COLE, Jr.
EDWIN R. COX.